(No Model.)

C. A. DAVIS.
HANDLE FOR TOOLS OR OTHER ARTICLES.

No. 412,479. Patented Oct. 8, 1889.

Witnesses:
James F. DuHamel
Horace A. Dodge

Inventor:
Charles A. Davis,
by Dodge Sons,
Attys.

UNITED STATES PATENT OFFICE.

CHARLES A. DAVIS, OF WASHINGTON, DISTRICT OF COLUMBIA.

HANDLE FOR TOOLS OR OTHER ARTICLES.

SPECIFICATION forming part of Letters Patent No. 412,479, dated October 8, 1889.

Application filed November 9, 1888. Serial No. 290,379. (No model.)

*To all whom it may concern:*

Be it known that I, CHARLES A. DAVIS, of Washington, in the District of Columbia, have invented certain new and useful Improvements in Handles for Tools and other Articles, of which the following is a specification.

My invention relates to the manufacture or preparation of handles for tools and implements of all kinds, and is particularly designed for those in which the hand guides the implement while the eye is fixed upon a mark or object, moving or stationary.

The invention consists, essentially, in the employment and treatment of a handle formed wholly or in part of a substance or composition which may be readily rendered soft or plastic, and which, when so softened, may be grasped by the hand and squeezed or pressed into exact conformity to the hand, so that each person may fashion the handle of a tool or implement which he is to use to exactly fit his hand, the composition being allowed or caused to harden subsequently.

Figure 1:
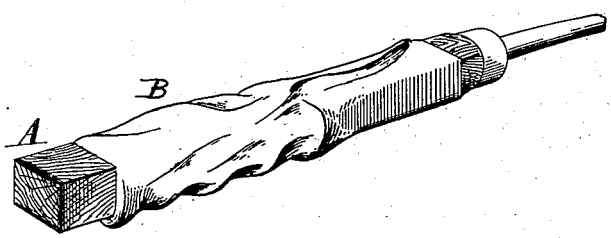
Figure 2:
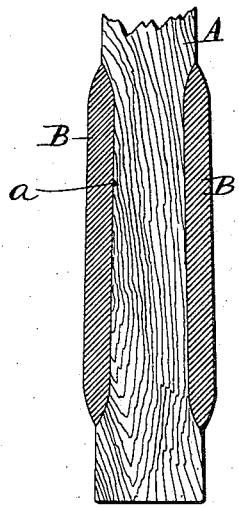
Figure 3:
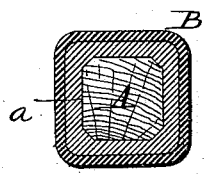
Figure 4:
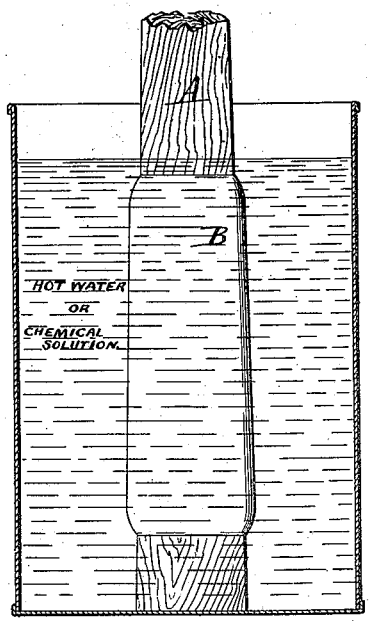
Figure 5:
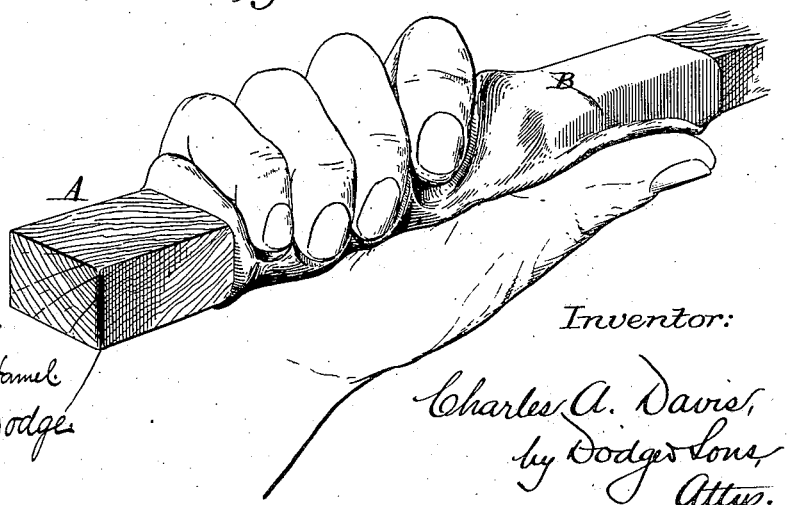

In the drawings, Figure 1 is a perspective view of a handle prepared for use in accordance with my invention; Figs. 2 and 3, respectively longitudinal and transverse sectional views of the same; Fig. 4, a view illustrating the preferred mode of softening the composition; Fig. 5, a view showing how the handle is brought to the required form.

It is a fact well known to anatomists and physiologists that the human hand varies greatly in different persons, modified, also, by the differing nature and conditions of their various employments. It is likewise well known that the number of ultimate nerve-filaments or nerve-terminals is greater in the palm of the hand than on any other portion of the surface of the person, and the greater the number of these nerve-terminals that can be brought into contact with the handle of a tool or implement, in a position of natural adaptation, the more purely automatic will be the action of the muscles controlling its movements and the more independent will it become of any guiding power other than that afforded through the rapid action of the eye. In other words, the more perfectly the handle fits or conforms to the surface of the hand, as the latter grasps or closes upon such handle, the more accurate and certain will be the guiding and manipulation of the implement, whatever it may be. To produce such a handle, I make use of a composition or substance variable both as to its nature and its proportions, according to the special application contemplated, which composition or substance constitutes, in whole or in part, the handle, and which is susceptible of being softened and rendered plastic, though not liable to become thus plastic under normal conditions.

The composition which I have thus far found most satisfactory for the general purposes of this invention is that known as "dental vulcanite," which varies in character, some qualities being susceptible of being rendered plastic at a lower temperature than others. This composition in its ordinary proportions will not withstand a very high temperature, and should therefore not be unduly subjected to the direct rays of the sun in very hot climates.

By preference I combine in the one handle two qualities or grades of composition—a softer or more readily-softened grade for the interior and a harder or less readily-softened grade for the exterior—though this and the character of the composition are both optional. Other preparations capable of being softened by chemical solutions or agents, or in any other ways, may likewise be employed.

In carrying out my invention I preferably make use of the ordinary handle, reducing the same at the point or points where the composition is to be applied, and filling out the reduced portion to whatever size may be deemed expedient by means of such composition, though, as above mentioned, the entire handle may be composed of the composition.

The drawings illustrate the preferred mode of construction.

A indicates a wooden handle, which may be that of a hammer, mallet, chisel, carving-tool, the stock or handle of a tennis-racket, a cricket or base-ball bat, a croquet-mallet, the handle of an oar, the stock or grip of a pistol or gun, or, in fact, the handle of any implement whatsoever that requires to be used with care and accuracy. This handle is cut away or reduced at that part which is naturally grasped by the hand, as shown at *a*, Fig. 2, and around this reduced portion is applied a body B of the selected composition or alloy, which is or may be made to take the configuration of the ordinary handle; or, as is deemed advisable, it may be made to exceed the natural size thereof. The body B is applied in a plastic or semi-fluid state, and is allowed to set or harden. Its surface may be finished, coated, or ornamented in any manner desired or left in its natural condition, and the handles thus prepared are ready for sale. The purchaser, in order to give to the handle the precise form necessary to accurately fit or conform to his own hand, then immerses the handle A in water in a sand bath, or places it in a suitable chamber, previously heated to the requisite temperature, or, having placed it in such bath or chamber, brings the latter to the proper temperature to soften the body B; or, if the composition is of proper character for that purpose, it may be immersed in a suitable chemical solution and thereby softened. When the body B is sufficiently softened to become thoroughly plastic, the handle is withdrawn, and the body B is firmly grasped in the hand by which it is to be held, care being taken to grasp it in the precise position and way in which it is to be held in use. The correct position being ascertained and secured, a firm pressure or squeeze is given the plastic body B, and then the handle is laid aside to cool and set or harden, after which (with or without special finishing, as desired) it is ready for use.

While I have spoken of this final preparation of the handle as being performed by the purchaser, it is apparent that it may and often will be done by the merchant selling the goods, the only act required of the purchaser being the squeezing or grasping of the plastic body to secure an exact impression of his hand.

Some compositions—those, for instance, into which caoutchouc enters as a constituent element—might, perhaps, adhere to the hand to a greater or less extent, and any preparation requiring a high temperature to render it plastic will be liable to burn the hand that grasps it unless such result be guarded against. I find, however, that if the hand be well dusted over with powdered soapstone, plumbago, plaster-of-paris, flour, or like substance both these difficulties are avoided, soapstone being peculiarly efficient for the purpose. An old glove will likewise adequately protect the hand.

The employment of compositions of differing grades (of which two or more may be used together) causes the outer and harder preparation to act as a skin or retaining body, while the softer composition within, being more plastic, yields readily to the pressure of the hand, and of course permits or causes the outer layer or skin to yield with it.

The handle prepared for use in the manner above set forth, touching the hand at every point alike, distributes the resistance offered by the handle in its manipulation to all parts of the hand alike, and prevents the overlapping of the tissues, and thus avoids the formation of blisters. The even distribution of the resistance enables the person using the implement to apply much greater force thereto without pain or injury to the hand than is possible with a handle not accurately molded to the hand, and in rowing, sawing, chopping, and performing like operations calling for the expenditure of great or considerable force, this is a matter of great importance, especially when attended, as it is with such a handle, by far greater accuracy in guiding and directing the implement. With an oar having such a handle the act of "feathering" the blade becomes a matter of ease and certainty, and the necessity for observing the position of the blade is overcome. This is especially important in crowded places and at night. So, too, in chopping wood the position of the cutting-edge of the ax is always known to the chopper, and with fire-arms the sense of feeling enables the marksman to determine the angle and direction of the barrel of the arm. Equally true is this of swords, foils, and the like, of rackets, bats, carving-tools, and, in fact, of an almost endless variety of implements.

I deem a composition having a softening-point of about 212° Fahrenheit desirable, because it is easy to determine such temperature without measuring-instruments, and a composition which softens at or above that point will remain hard under all ordinary conditions of use. Obviously, however, a much lower or a higher point of softening may be adopted.

Any subsequent modification of the handle that may become desirable may be effected by repeating the above-described operation or treatment.

As a result of my invention a feeling of security and confidence is produced, the muscles of the hand, wrist, and arm not only become masters of a forward, backward, or lateral motion, as the case may be, but the plane of the striking-surface in case of a cricket-bat, tennis-racket, or like implement always bears a given known relation to the hand of the operator.

Having thus described my invention, what I claim is—

The herein-described method of fitting handles to the hand, which consists in forming or providing the handle with a body of material capable of being rendered plastic, softening said material, grasping the same in the manner of grasping it in use, applying pressure sufficient to cause the material to conform accurately to the hand or hands, and, finally, causing or permitting the material to harden.

In witness whereof I hereunto set my hand in the presence of two witnesses.

CHARLES A. DAVIS.

Witnesses:
 WALTER S. DODGE,
 HORACE A. DODGE.